(12) United States Patent
Moradell-Casellas et al.

(10) Patent No.: US 8,621,978 B2
(45) Date of Patent: Jan. 7, 2014

(54) ACTUATOR FOR OPENING AN AIRCRAFT ENGINE NACELLE COWL

(75) Inventors: Pierre Moradell-Casellas, Saint Georges des Groseillers (FR); Stephane Lederle, Fontainebleau (FR)

(73) Assignee: Aircelle, Gonfreville l'Orcher (FR)

( * ) Notice: Subject to any disclaimer, the term of this patent is extended or adjusted under 35 U.S.C. 154(b) by 930 days.

(21) Appl. No.: 12/672,293

(22) PCT Filed: Jun. 25, 2008

(86) PCT No.: PCT/FR2008/000895
§ 371 (c)(1),
(2), (4) Date: Feb. 5, 2010

(87) PCT Pub. No.: WO2009/024666
PCT Pub. Date: Feb. 26, 2009

(65) Prior Publication Data
US 2012/0125191 A1    May 24, 2012

(30) Foreign Application Priority Data
Aug. 20, 2007   (FR) ...................................... 07 05899

(51) Int. Cl.
*F15B 15/26*    (2006.01)
(52) U.S. Cl.
USPC .................................................. 92/23; 92/29

(58) Field of Classification Search
USPC .................. 92/15, 23, 24, 25, 26, 29, 30, 114
See application file for complete search history.

(56) References Cited

U.S. PATENT DOCUMENTS

| | | | |
|---|---|---|---|
| 2,887,991 A | 5/1959 | Driskel | |
| 3,022,771 A | 2/1962 | Chace | |
| 3,583,288 A | 6/1971 | Nepp | |
| 6,227,485 B1 | 5/2001 | Porte | |
| 7,216,581 B2 * | 5/2007 | McAuley | ......................... 92/24 |
| 2005/0168010 A1 | 8/2005 | Cleland | |

FOREIGN PATENT DOCUMENTS

| | | |
|---|---|---|
| AU | 438013 | 7/1973 |
| FR | 2882087 A1 | 8/2006 |

OTHER PUBLICATIONS

International Search Report PCT/FR2008/000895; Dated May 11, 2009.

* cited by examiner

*Primary Examiner* — Michael Leslie
(74) *Attorney, Agent, or Firm* — Brinks Gilson & Lione

(57) ABSTRACT

Actuator (V) for opening an aircraft nacelle cowl (7), comprising a dead travel device (19), characterized in that it comprises means (42a, 42b, 43) for blocking the dead travel device (19) when this actuator (V) is extended.

5 Claims, 2 Drawing Sheets

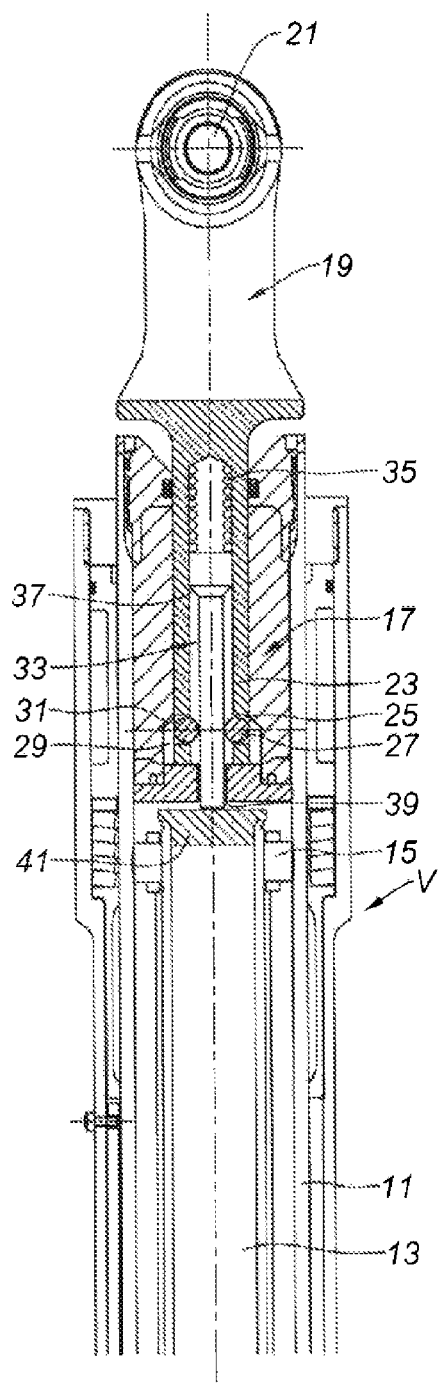
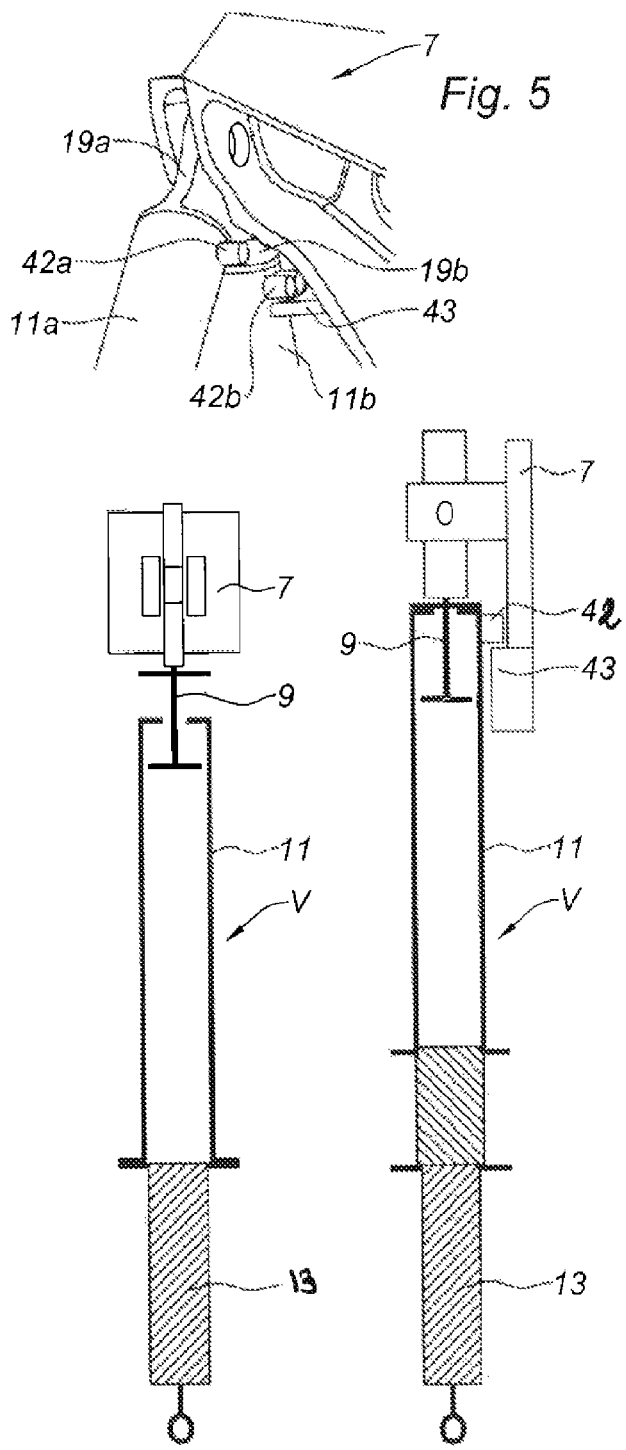
Fig. 3    Fig. 2    Fig. 4

ACTUATOR FOR OPENING AN AIRCRAFT ENGINE NACELLE COWL

TECHNICAL FIELD OF THE INVENTION

The disclosure relates to an actuator for opening an aircraft engine nacelle cowl and to a nacelle equipped with at least one such actuator.

BACKGROUND

As is known per se, an aircraft engine nacelle comprises at least one cowl able to move between a service position, in which this cowl covers the engine, and a maintenance position, in which this cowl is distanced from the engine and thus allows the technician to work on the engine or on the underside of the cowl, to carry out maintenance operation.

Given the high weight of such a cowl, particularly on large nacelles such as those used on the Airbus A380, it is absolutely essential that means for assisting the opening of this cowl be provided.

These assistance means, often known even in other languages by their English-language abbreviation PCOS (which stands for "Powered Cowl Operating System"), generally comprise at least one hydraulic or electric actuator which can be made to open or to close the cowl.

As is known per se, an actuator such as this comprises, at its end collaborating with the cowl, a device often known, even in other languages, by its English name as "free play" device, which always allows the end of this actuator a small additional travel for a given extension of the actuator.

The purpose of this free play is, on the one hand, to avoid compression/tension forces being transmitted to the actuator in a flight situation as the cowl experiences deformation associated with particular pressure profiles and, on the other hand, to allow easy manual closure of the cowl at the end of the maintenance operations in spite of the friction generated by the tolerances on the various components which interact.

A jury strut or prop is also provided so as to block the cowl in the open position and relieve the actuator of the weight of this cowl. This jury strut is fitted by hand, by the technician, and removed by the same just before the cowl is closed.

In practice, just after having opened the cowl using the actuator and after having fitted the jury strut, the technician causes the actuator to retract slightly so as to make sure that the weight of the cowl is indeed being borne by the jury strut, rather than by the actuator: when this is done, the free play device extends at least partially.

Now, the jury strut may sometimes break under the weight of the cowl and/or of the loads applied by the actuator instructed to close by the operator; because of the presence of the free play device which is initially in an at least partially extended position, there will be a veritable dropping of the cowl onto the actuator, from a height that corresponds to the extension of the free play device.

This drop comes as a great shock to the technician working between the cowl and the engine, and may even injure him. In addition, this sudden sharp transfer of the weight of the cowl onto the actuator may damage this actuator because of the additional dynamic effect introduced.

BRIEF SUMMARY

The disclosure provides an actuator for opening an aircraft nacelle cowl comprising a free play device, notable in that it comprises means to block this free play device when this actuator is extended.

Thanks to these blocking means, the free play device will form just one entity with the body of the actuator, which means that there is no longer any risk of the cowl suddenly dropping and generating a dynamic effect if the jury strut should break.

According to optional features of the actuator according to the invention, considered alone or in combination:

- said blocking means are designed to block said free play device in the retracted position: such blocking means make it possible to prevent any extension of the free play device during the slight retraction of the actuator performed once the jury strut has been fitted; hence, the weight of the cowl can be transferred directly to the actuator, rather than to the means that block the free play device;
- said actuator comprises a cylinder and said free play device comprises a yoke mounted such that it can slide axially at the end of said cylinder;
- said cylinder is telescopically mounted on an inner rod, said blocking means comprise a core and means of locking said yoke with respect to said cylinder, this core being mounted such that it can slide inside said yoke against the action of elastic means interposed between this yoke and this core, and being able to deactivate said locking means when it is pushed by said rod inside said yoke, and to activate these locking means when it is no longer being pushed by said rod;
- said locking means comprise a ball latch comprising cylindrical housings formed in said yoke, an annular housing formed in a plug mounted at the end of said cylinder and having a radial thickness smaller than the diameter of said balls and a chamfered part secured to said core, able to push said balls from said cylindrical housings toward said annular housing when said core emerges from said yoke under the action of said elastic means so that said balls block the outward sliding of said yoke with respect to said plug;
- said blocking means comprise a stud connected fixedly to said cylinder and able to engage with a fitting secured to said cowl once said cowl has opened through a certain angle, this engagement having the effect of keeping said yoke and said cylinder in the retracted position relative to one another;
- said actuator is electric,
- said actuator is hydraulic.

The present invention also relates to an aircraft engine nacelle notable in that it is equipped with an actuator in accordance with the forgoing.

BRIEF DESCRIPTION OF THE DRAWINGS

Other features and advantages of the present invention will become apparent in the light of the description which will follow, and from studying the attached figures in which:

FIG. 2 schematically depicts the actuator V used to open the cowl of FIG. 1, in the retracted position;

FIG. 3 depicts a first alternative form of this actuator equipped with a device for blocking the "free play", shown in axial section through the end of this actuator that collaborates with the cowl;

FIG. 4 schematically depicts a second alternative form of this actuator equipped with a device for block the "free play", in the extended position; and FIG. 5 is a perspective depiction of that part of this actuator which collaborates with the cowl, firstly in the retracted position and secondly in the extended position.

DETAILED DESCRIPTION

Figure 1:
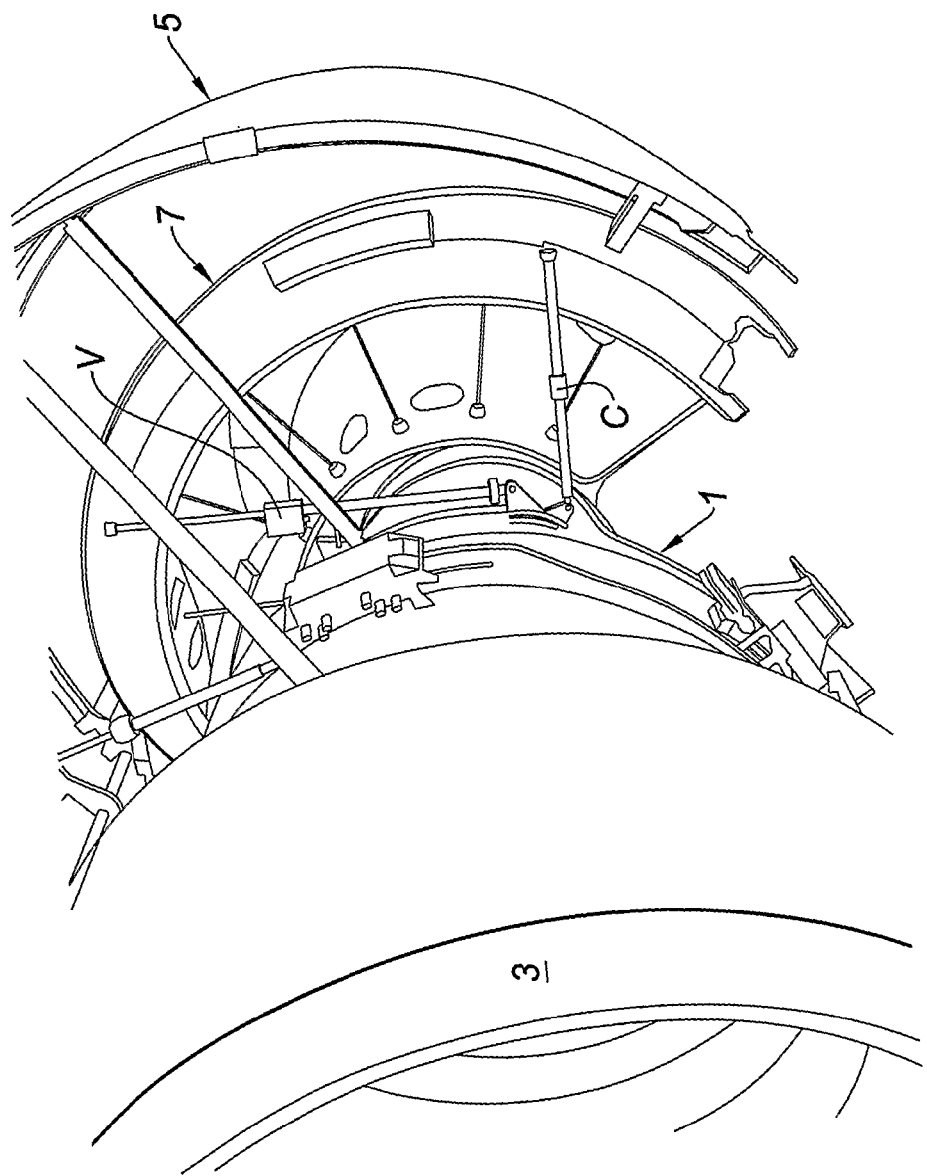
FIG. 1 is a perspective view of an aircraft engine and nacelle assembly, the cowls of this nacelle being depicted in the maintenance position.

Reference is made to FIG. 1 which shows an aircraft turbojet engine placed inside a nacelle of which the front part 3, a cowl 5 of the intermediate part, and a cowl 7 of the rear part of this nacelle are visible.

The cowls 5 and 7 are depicted in the maintenance position, that is to say in a position where they open upward, providing access for a technician to the turbojet engine 1.

As is known per se, the cowl 5 is designed to cover that part of the engine 1 which comprises a fan, and the cowl 7 may comprise thrust reversal means, such as a cascade-type thrust reverser.

The cowls 5 and 7 are in fact half-cowls, that is to say that they each surround just half the circumference of the turbojet engine 1.

Actuating the cowl 7 from its operating position in which it covers the rear of the turbojet engine 1, to its open position visible in FIG. 1, is done by means of at least one electric or hydraulic actuator V that the technician can operate.

When this actuator V is in the extended position, as shown in FIG. 1, the cowl 7 is open and can be kept in this position by means of a jury strut C, positioned by hand by the technician between the turbojet engine 1 and the cowl 7.

Reference is now made to FIG. 2, in which the actuator V is depicted in the retracted position, and it may be seen that this actuator V collaborates with the cowl 7 via a yoke 9 mounted such that it can slide at the end of this actuator.

In the special case in which the actuator 2 is an electric actuator, the layout of the various components situated in the end of this actuator which collaborates with the cowl 7 can be appreciated by studying FIG. 3.

That figure shows that the actuator V comprises an outer cylinder 11 mounted such that it can slide with respect to a rod 13.

More specifically, the rod 13 is a threaded rod, able to be turned by an electric motor secured to the turbojet engine 1 (not depicted).

Mounted on this threaded rod is a nut (not depicted) which is prevented from rotating with respect to this rod and prevented from effecting any axial translational movement relative to the cylinder 11.

As can therefore be appreciated, the turning of the rod 13 has the effect of causing an axial translational movement of said nut, and therefore of the cylinder 11.

This electric device for extending and retracting the actuator V is often known as a "ball screw".

The cylinder 11 is blanked off, at its end situated near the cowl 7, by a plug 17 in which there is slidingly mounted a yoke 19 comprising an eye 21, via which the actuator can be attached to the cowl 7.

In its part 23 able to penetrate inside the plug 17, the yoke 19 comprises cylindrical housings 25 in which the balls 27 are located.

Facing these cylindrical housings when the yoke 19 is in its retracted position visible in FIG. 3, there is an annular housing 29 formed in the plug 17.

In its upper part, that is to say in its part closest to the depicted end of the actuator V, the annular housing 29 has a chamfered part 31.

A core 33 is mounted inside the yoke 19 such that it can slide against the action of a spring 35.

This core 33 itself comprises a chamfered part 37 able to collaborate with the balls 27 in a way which will be explained later.

It may be noted that the core 33 passes through an orifice 39 formed in the plug 17, via which it can collaborate with the end 41 of the threaded rod 13.

The way in which this first alternative form of the actuator V works is as follows.

The position of the actuator V depicted in FIG. 3 corresponds to that of FIG. 2, that is to say that this actuator is in the retracted position: this position is the position that corresponds to the cowl 7 being in the closed position.

In this position, the rod 13 is practically in abutment against the plug 17, and exerts a thrusting force on the core 33 against the action of the elastic means 35; the chamfer 37 does not collaborate with the balls 27, and these balls remain in the annular housing 25 of the yoke 19.

In this configuration, these balls 27 therefore do not in any way block the sliding of the yoke 19 inside the plug 17: this yoke 19 can therefore slide freely inside this plug, thus allowing the cowl 7 a certain amount of play relative to the actuator V.

This play on the one hand allows the deformation forces inherent to particular pressure profiles in flight to be transferred to this actuator V and on the other hand allows the cowl to be closed correctly in spite of the tolerances on the various components involved during this closure.

When a technician wishes to open the cowl 7 so as to gain access to the turbojet engine 1, he operates the electric motor which turns the threaded rod 13, this turning having the effect of causing the cylinder 11 to slide relative to this rod, and therefore of bringing the actuator V into its extended position.

As this happens, the end 41 of the rod 13 moves away from the plug 17, by virtue of which the core 33 moves away from the yoke 19 toward the inside of the cylinder 11, under the action notably of the spring 35, and does so until the chamfered part 37 of this core 33 pushes radially on the balls 27 to cause these balls to move from the cylindrical housings 25 of the yoke 19 toward the annular housing 29 of the plug 17.

The radial width of the annular housing 29 is smaller than the diameter of the balls 27, which means that these balls cannot completely leave the cylindrical housings 25 formed in the yoke 19: these balls therefore continue to straddle these two housings, thus blocking the outward sliding movement of the yoke 19 with respect to the plug 17.

Thus, when the panel 7 is fully open, the yoke 19 is locked in terms of translational movement with respect to the actuator 11: these two components then act as a single one-piece component.

Thus, when the technician comes to position the safety jury strut C between the turbojet engine 1 and the panel 7, and retracts the actuator V slightly, there will be no possibility of any travel of the yoke 19 with respect to the cylinder 11, nor will there any longer be any risk of the cowl 7 dropping suddenly and sharply should this jury strut break.

In the embodiment of FIGS. 4 and 5, the yoke 19 is blocked in the retracted position relative to the cylinder 11 by simplified mechanical means.

It will be noted that, in FIG. 5, the references a and b relate to the actuator V when respectively in the retracted position (that is to say the cowl 7 closed position) and in the extended position (that is to say the cowl 7 open position), the two positions of this actuator being depicted simultaneously in this figure.

As may be seen in FIGS. 4 and 5, the cylinder 11 is equipped, in its part situated near the yoke 19, with a finger 42 able to collaborate with a fitting 43 secured to the cowl 7.

More specifically, the geometry of the assembly is such that when the cowl 7 is closed, the finger 42 is distant from the fitting 43, thus allowing the small translational movements of the yoke 19 with respect to the cylinder V.

By contrast, when the cowl 7 opens, the finger 42 engages with the fitting 43, and this prevents any relative sliding of the yoke 19 with respect to the cylinder 11, thus providing the blocking desired for maintenance operations.

Of course, the present invention is not in any way restricted to the embodiments described and depicted, which have been provided simply by way of example.

The invention claimed is:

1. An actuator for opening an aircraft nacelle cowl comprising:
   a cylinder;
   a free play device comprising a yoke mounted such that it can slide axially at an end of said cylinder; and
   blocking means of the free play device positioned in a retracted position when the actuator is extended,
   wherein said cylinder is telescopically mounted on an inner rod, wherein said blocking means comprise a core and locking means of said yoke with respect to said cylinder, wherein the core is mounted such that it can slide inside said yoke against action of elastic means interposed between the yoke and the core, and wherein the core is able to deactivate said locking means when it is pushed by said rod inside said yoke, and to activate the locking means when it is no longer being pushed by said rod.

2. The actuator as claimed in claim 1, wherein said locking means comprise a ball latch comprising cylindrical housings formed in said yoke, an annular housing formed in a plug mounted at the end of said cylinder and having a radial thickness smaller than a diameter of said balls and a chamfered part secured to said core, able to push said balls from said cylindrical housings toward said annular housing when said core emerges from said yoke under action of said elastic means so that said balls block an outward sliding of said yoke with respect to said plug.

3. The actuator as claimed in claim 1, wherein said blocking means comprise a stud connected fixedly to said cylinder and able to engage with a fitting secured to said cowl once said cowl has opened through a certain angle, this engagement keeping said yoke and said cylinder in a retracted position relative to one another.

4. The actuator as claimed in claim 1, wherein it is electric.

5. An aircraft engine nacelle, wherein it comprises at least one actuator as claimed in claim 1.

* * * * *